March 10, 1970     L. BALAMUTH     3,499,436
METHOD AND APPARATUS FOR TREATMENT OF ORGANIC STRUCTURES
WITH COHERENT ELASTIC ENERGY WAVES Filed March 10, 1967             4 Sheets-Sheet 1

PRIOR ART

FIG.3

PRIOR ART

INVENTOR.
LEWIS BALAMUTH

BY

*Leonard W. Suroff*
ATTORNEY

March 10, 1970 L. BALAMUTH 3,499,436
METHOD AND APPARATUS FOR TREATMENT OF ORGANIC STRUCTURES
WITH COHERENT ELASTIC ENERGY WAVES
Filed March 10, 1967 4 Sheets-Sheet 2

FIG.4A

CASE I  b≪λ

FIG.4B

CASE II  b=λ/2

FIG.4C

CASE III  b≫λ

INVENTOR.
LEWIS BALAMUTH

BY Leonard W. Suroff
ATTORNEY

March 10, 1970  L. BALAMUTH  3,499,436
METHOD AND APPARATUS FOR TREATMENT OF ORGANIC STRUCTURES
WITH COHERENT ELASTIC ENERGY WAVES
Filed March 10, 1967  4 Sheets-Sheet 3

INVENTOR.
LEWIS BALAMUTH

BY
Leonard W. Suroff
ATTORNEY

INVENTOR.
LEWIS BALAMUTH
BY
Leonard W. Suroff
ATTORNEY

United States Patent Office 3,499,436
Patented Mar. 10, 1970

3,499,436
METHOD AND APPARATUS FOR TREATMENT OF ORGANIC STRUCTURES WITH COHERENT ELASTIC ENERGY WAVES
Lewis Balamuth, New York, N.Y., assignor to Ultrasonic Systems, Inc., Farmingdale, N.Y., a corporation of Delaware
Filed Mar. 10, 1967, Ser. No. 622,126
Int. Cl. A61h 1/00; A61b 17/00
U.S. Cl. 128—24   38 Claims

ABSTRACT OF THE DISCLOSURE

The use of coherent elastic energy waves in a defined frequency range, of generally from 500 cycles per second to 600,000 cycles per second, for the treatment of organic structures, such as humans and other animals, fish or plants, for therapeutic purposes.

BACKGROUND OF THE INVENTION

Field of the invention and description of the prior art

This invention relates to the treatment of organic structures with ultrasonic elastic energy waves, and more particularly to an improved method and apparatus for treating biological systems, such as animals, including man, plants and other forms of cellular structures, with ultrasonic vibrations for producing beneficial effects therein.

Heretofore, mechanical vibrations have been applied to various organic structures or biological systems for obtaining beneficial results. With respect to animals and particularly humans, the frequency of vibrations have been generally in two frequency spectrums.

The lower frequency spectrum is in the range of generally 60 c.p.s. to 120 c.p.s. An example of the low frequency application of mechanical vibrations is found in massagers, bed vibrators, chair vibrators, in which the low frequency vibrations are coupled to organic structures by direct contact. All these are well known for their beneficial action in stimulating circulation and in relaxing tensed muscles and high strung nerves.

The higher frequency spectrum is in the range of generally 800,000 c.p.s. to 3,000,000 c.p.s. an example of the ultra high frequency application of mechanical vibrations is in therapeutic or medical diathermy equipment, wherein the conversion of elastic energy waves into heat are relied upon.

Briefly the applicant has now discovered that mechanical vibrations, properly transmitted to the biological system, in the frequency range of from 16,000 c.p.s. to 100,000 c.p.s., as it applies to humans, can provide beneficial treatment without the known detrimental attributes associated with the prior methods. The frequency selected in the range from generally 500 c.p.s. to 600,000 c.p.s. may vary with the organic structures under treatment, as for example plants, fish, livestock, etc., all of which may be treated in accordance with the teachings of the present invention.

During the past several decades the foundation has been laid for a new branch of physics, which should be called sonics. This branch of science contemplates the use of mechanical vibrations for the treatment of an extraordinary variety of systems, such as are found in dentistry, metal forming, flaw detection, machinery cleaning, welding, etc. As happens with any new branch of physical science, there proliferates applications in other branches of science and the foundations are laid for new combination sciences such as geosonics, biosonics, psychosonics and the like. Although such designations do not yet exist in common parlance, nevertheless applicant is suggesting these to designate new areas of scientific exploration.

In particular, biosonics contemplates the use of mechanical vibration or acoustic energy in the treatment of biological systems. In the case of animals, including man, one must differentiate between two effects due to acoustic vibration. Sound, when received in the ear, is capable of producing a variety of inner biological phenomena, depending very much in the psychological conditioning ot the subject. Such treatment effects belong to psychosonics and are more in the category of the types of phenomena usually associated with psychosomatic medicine. This important area of sonic effects is not contemplated in this invention.

What is under consideration in the present invention is the use of mechanical vibrations from generally the sonic up to the low ultrasonic frequency range. The underlying principle is the fact that mechanical vibrations may be of two general kinds. The ordinary gross elastic vibrations of bodies or masses, belong to what are called "coherent" vibrations or waves. Coherence means that the vibration of the various parts of the wave are in definite phase relation in time with one another. By contrast, one has the incoherent or phase disconnected vibration to be found in solids and liquids and which, in general, comprise what is called the "thermal energy" of a body.

Most ultrasonic vibration of ultra high frequency (1,000,000 cycles per second and higher) are currently widely used for treatment of biological systems including medical therapy for humans. But, due to the high absorption coefficient of high frequency mechanical or elastic waves, the coherent wave energy is rapidly dissipated into thermal energy or heat and the effects produced are mainly due to temperature rise in the hard and soft tissues. In fact, medical ultrasonic therapy as practiced is severely limited by this thermal effect. The dosage of energy must be maintained low enough so that dangerous temperature rises will not occur in vital tissue and organs. In this way the amount of coherent wave energy available for treatment purposes is very small.

This invention contemplates the achievement of just what the high frequency therapy cannot do. By employing ultrasonic vibrations as hereinafter described, it is possible to put considerable quantities of coherent wave energy into biological systems without significant temperature rise. This is so because in general the absorption coefficient of mechanical vibration rises at least linearly with frequency. In fact, in bony tissue it rises as the square of frequency and in soft tissue as the first power of the frequency. This means that, looking at any small part of a biological structure, say one small part of a single cell, the passing of the elastic wave causes a rapid oscillation of compression and tension stresses in the structure. This is a sort of "micromassage" which has beneficial action on the general tonus of the biological system.

Applicant has pioneered in this field especially in the dental and surgical areas and has invented or co-invented numerous low frequency ultrasonic devices, including an ultrasonic knife, U.S. Patent No. 3,086,288, an ultrasonic dental drill, U.S. Patent No. 3,075,288, and an ultrasonic prophylaxis unit, U.S. Patent No. 3,076,904. Consequently, in the field, it has been found that when the low frequency energy is applied to tissue, as say, in surgical or peridontal procedures, the results have shown faster healing and healthier tissues. The present invention does not generally contemplate the direct application of this vibration as just described.

OBJECTIVES OF THE INVENTION

An object of the present invention is to provide a variety of acoustical auditoriums or treatment enclosures so designed as to permit the generation of and transmission through the biological structure positioned therein, of coherent elastic energy waves of sufficiently low absorption coefficient so as to obtain a therapeutic treatment to the biological structure.

Accordingly, an object of the present invention is to provide a method and apparatus for the treatment of organic structures by transmitting ultrasonic waves therethrough at a frequency level to put considerable quantities of coherent elastic wave energy into the structure without a significant temperature rise therein.

Another object of the present invention is to provide a method and apparatus for the treatment of organic substructures to obtain the known beneficial results of applying mechanical vibrations thereto for therapeutic purposes but without substantially increasing the temperature level of the treated area.

Another object of the present invention is to provide a method and apparatus for irradiating an organic structure to obtain micro molecular massage of the cells therein without the development of excessive heat thereof.

Another object of the present invention is to provide a method and apparatus employing sonic elastic energy waves for the treatment of biological systems, such waves being at a level below the cavitational threshold of the fluid medium within the cellular structure of the biological system.

A further object of the present invention is to provide a method and apparatus for sonically treating humans and other animals at energy levels that are safe for their treatment.

A still further object of the present invention is to provide a method and apparatus for treating large portions of humans, and other animals, with ultrasonic vibrations without endangering the animal by possibly increasing the temperature level of the treated portion.

Yet another object of the present invention is to provide a method and apparatus for the treatment of plants and animals to increase their growth rate.

Still yet another object of the present invention is to provide a method and apparatus for sonically treating seeds to stimulate them to germinate in a shorter period of time.

Another object of the present invention is to provide a method of treatment to a biological system without severely limiting the movement of the system during its irradation with coherent wave energy.

Other objects and advantages of this invention will become apparent as the disclosure proceeds.

SUMMARY OF THE INVENTION

The outstanding and unexpected results obtained by the practice of the method and apparatus of this invention are attained by a series of features, steps and elements assembled and working together in inter-related combination. In its essential aspects the invention contemplates placing the organic structure to be treated in an acoustic auditorium or enclosure of coherent elastic wave energy which penetrates pervasively into the acoustically accessible inner region of the organic structure.

The acoustic enclosure may be in the form of a theatre, room, shower, bathtub, tank, swimming pool, aquarium, ocean, lake, etc., containing an elastic medium which acts as the path to transmit the coherent elastic energy waves from its source to the organic element. The coherent elastic wave energy emanating from its source, preferably in the form of a biosonic wall, emits mechanical vibrations in a frequency range that will permit the waves to intimately penetrate and traverse the biological system while generating a level of intensity below the cavitational threshold of the fluid medium within the cellular structure of the organic structure. These waves effect a micromassage of the cellular components of the entire organic structure being treated, or a selected organ or part thereof, to obtain beneficial therapeutic results.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, in which:

Similar reference characters refer to similar elements throughout the several views of the drawings.

The apparatus illustrated in the drawings is intended to be exemplary of arrangements that may be successfully employed to carry out the functions of delivering acoustical energy to a variety of organic structures for beneficial effects.

Figure 1:
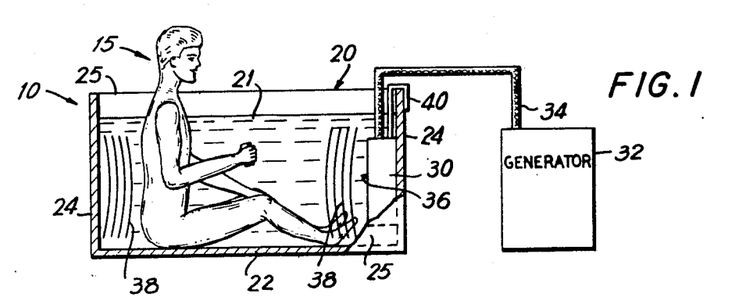
FIG. 1 shows in somewhat schematic form an acoustic auditorium for the treatment of an organic structure situated therein in accordance with the invention.

Referring to the drawings in detail, and initially to FIG. 1 thereof, it will be seen that an apparatus 10 for treating an organic structure or biological system 15, for example a human, may include an acoustic auditorium or chamber in the form of an enclosure 20, within which the organic structure 15 is positioned. Since this invention permits the treatment of a wide range of organisms from the microscopic to the macroscopic, the size, shape and construction of the acoustic auditorium 20 will vary. The physical characteristics of the acoustic auditorium are also related to the properties of the elastic medium 21 through which the acoustic energy is transmitted. If the elastic medium 21 is a liquid, such as water, then the acoustic auditorium may be in the form of a bathtub or rectangular tank having a bottom 22 and a pair of upright side walls 24 and front and rear walls 25. If the fluid medium is in the form of a gas or vapor then the acoustic auditorium need merely have means for confining the organic structure. One of the spaced apart walls 24 acts as a reflector surface so that the elastic energy waves passing through the organic structure 15 are reflected for multiple treatment of the organic structure.

The ultrasonic elastic waves of a compressional wave form are produced by a transducer 30 which is energized by an oscillation generator 32, with a power cable 34 connecting the two together. The generator 32 is an oscillator adapted to produce electrical energy having an ultrasonic frequency. The transducer 30 may be one of a variety of electro mechanical types, such as electrodynamic, piezoelectric, magnetostrictive or hydrodynamic. The hydrodynamic type needs a compressor and is entirely mechanical except for motors to run the compressor. The operating frequency may be in the higher sonic or ultrasonic ranges, but preferably in the order of 16,000 to 100,000 cycles per second when treating humans. Preferably the transducer 30 and generator 32 may be operated at both a fixed frequency or modulated over a defined frequency range. The specific oscillation generator 32 and transducer 30 for accomplishing the result may be conventional, and as such, a detailed description thereof need not be included in this disclosure since it is known to those skilled in the art. The transducer 30 has a vibratory output surface or biosonic wall 36 which is immersed in the elastic medium 21 and when energized will transmit a series of coherent elastic energy waves 38 through the elastic medium 21 and through the human 15. Support means 40 in the form of a bracket is provided to support the transducer in the tank 20.

The frequency modulation of the elastic waves 38 is important in that by varying the frequency over a defined range and wave length band the settling of permanent foci of energy is prevented. At the same time this permits the generation of effects due to possible resonances in the organic system. This is highly desirable when treating biological systems of a complex nature to obtain a sufficient stimulation of a variety of the body organisms that have different acoustical characteristics.

The elastic wave generating means 30, may be of the variable frequency non-resonant type, whereas other means of high frequency ultrasonic apparatus used for treatment must operate at resonance.

Since we do not wish to destroy the cells in the organic structure but merely subject them to a degree of flexure the energy level of the elastic waves in the acoustic auditorium 20 must also be within a frequency range such that the elastic waves 38 when penetrating and traversing the organic structure 15 generates a level of intensity below the cavitational threshold of the fluid medium within the organic structure.

Since this embodiment of the invention is illustrated with a human being, we have specific glands, organs, and nerve complexes which have definite shapes and dimensions. Acoustically each such substructure is like an acoustic auditorium within the main acoustic auditorium 20 of the entire structure. Through preliminary testing in a given case the linear length of the structure in the direction of the waves is determined and the frequencies specific to such structure can be selected. The use of white noise and a panaramoscope have been found useful for such purposes. In this way it is possible to select appropriate bands of frequency for the frequency modulated energy to be introduced through the agency of the biosonic wall 36.

As seen in FIG. 1 the human is placed in spaced relationship to the biosonic wall 36 and in spaced relationship to the opposite side wall 24. The opposite side wall 24 acts as an acoustic reflector so that the energy waves 38 moving along a generally linear path that pass through the human 15 are reflected and again are transmitted through the elastic medium 21 and human 15. Since a heating of the human tissue is not relied upon, the human may enter the tank prior or subsequent to the biosonic wall 36 being vibrated. The duration of the treatment will be dependent upon the area of the body requiring the stimulation or whether the entire submerged portion of the body requires the treatment.

If we consider sound in its travel let us consider each blood vessel, fatty deposit, tendon, muscle fibre and each interlying film of fluid as individual targets, against which the sound waves must first impinge before they can penetrate. Sound waves which are longer in dimension than the target which they strike have a tendency to either wrap around or penetrate the target with little or no reflection. This indicates that there will be little or no deposit of heat within the tissue where long waves are used, for example in the range of 16,000 c.p.s. to 100,000 c.p.s. for humans.

Conversely a sound wave which is shorter than the linear dimension of the target which it strikes will not penetrate so readily, because of the inefficient coupling at each interface formed where two different substances lie one against the other. A portion of the wave will be reflected back from each interface and will subsequently convert to heat at the point of reflection. Thus, the higher the frequency which may be used in ultrasonic therapy the less penetration will be had and the greater will be the heat deposits within the tissue which is penetrated.

I have found that by properly selecting the length of the elastic waves 38 for the size of the organic structure 15 it is possible to obtain the micromassage with a minimal of heat buildup. Generally the frequency for humans is tailored so that the linear length of the organic structure under treatment, in the direction of the elastic wave, is substantially equal to an integral odd or even number of wavelengths at the selected frequency of vibration.

In practice a frequency of vibration for the generator is selected for example at 25 kc./sec., and is frequency modulated to avoid persistent resonant effects in the organic substructures within a 2,000 c.p.s. range. In this manner the elastic waves 38 vary between 24 kc. and 26 kc. It is important that the intensity is well below the cavitation threshold of the fluid medium in the organic structure 15 and the elastic medium 21 in the acoustic auditorium 20. A good rule of thumb is that the intensity of vibration should be selected at one tenth of the cavitational threshold, the values of which are available in various books on ultrasonic energy. It is also possible to modulate the waves by using a preselected musical tape in the range of 22.5 kc. to 27.5 kc. with the tape limited to 5,000 c.p.s. peak.

THEORY OF PRESENT INVENTION AND
DISCUSSION OF PRIOR ART

Whereas a scientific explanation of the theory based on observation of the phenomena involved is disclosed below. It is to be clearly understood that the invention is by no means limited by any such scientific explanation.

Figure 2:
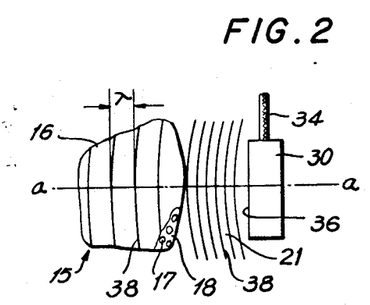
FIG. 2 is an enlarged section of a portion of the human anatomy showing the wave front passing through the organic structure in FIG. 1 to help illustrate the theory of the present invention.
Figure 2A:
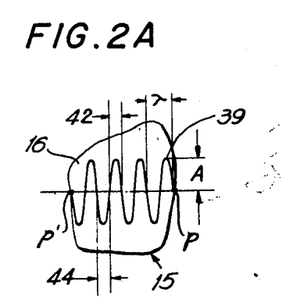
FIG. 2A is a diagram corresponding to a portion of FIG. 2 but comprising a curve plotting amplitude of vibration against wave length of a simple elastic wave passing through the organic structure.

The theory of the present invention is initially explained with respect to FIGS. 2 and 2A. FIG. 2 is an enlarged portion 16 of a homogeneous organic structure of the human anatomy 15, such as the liver, composed of a series of cellular structures 17 containing a fluid medium 18 therebetween. When the oscillation generator 32 is energized the output surface 36 will create a series of coherent elastic energy waves 38 (FIG. 2), which appear as wave fronts moving in spaced relation to each other, one wavelength, $\lambda$, apart along line $a$—$a$. These waves are coupled and transmitted to the organic structure 15 by means of the elastic medium 21. The wave pattern 39 of a single moving wave 38 is illustrated in FIG. 2A as it passes along line $a$—$a$, through the enlarged portion 16 of a homogeneous organic structure over the distance $p$–$p'$. The spacing between the waves in the organic structure might be further apart than in the fluid medium 21 because of the difference in the speed of sound in the fluid medium and the organic structure. The wave is purely physical, or mechanical in nature in that each complete wave includes an area of compression 42 in one half of the wave and a corresponding area of tension or rarefaction 44 in the other half of the wave. Thus, it may be understood that soundwaves in passing through any material create a series of alternate areas of pressure and tension, in which particle motion is extremely slow yet the magnitude of acceleration is high.

The speed of sound travel varies greatly through various substances. For instance it is approximately 1,100 feet per second in air and 4,860 feet per second in sea water. Inasmuch as the animal body is made up of fatty tissue, muscle fibre and bone, interleaved with lubricating fluids or fluid mediums and each of these materials have a different sound conducting speed, the sound travel through the body may be estimated at approximately 3,500 to 4,000 feet per second.

As seen in FIG. 2A the amplitude, A of vibration remains substantially constant as the wave 39 is propagated and penetrates intimately into and through living tissue for producing certain effects therein. By employing ultrasonic vibrations for humans in the frequency range of from 16,000 c.p.s. to 100,000 c.p.s., it is possible to put considerable quantities of coherent wave energy into a biological system without a significant temperature rise. This is due to the fact that the absorption coefficient of mechanical vibrations rises at least linearly with frequency. In fact, in bony tissue it rises as the square of frequency and in soft tissue as the first power of the frequency. For example, if the absorption coefficient of 1 mc./sec. waves is some value, X, then at 16 kc./sec. The absorption coefficient is only 1% of X. Thus, at 16 kc./sec. practically all the elastic energy transmitted into tissue remains as elastic energy. This means that looking at any small part of a biological structure, the passing of an elastic wave 38 causes a rapid oscillation or compression 42 and tension stresses 44 in the structure. This is a sort of micromassage which has beneficial action on the general tonus of the biological system.

Figure 3:
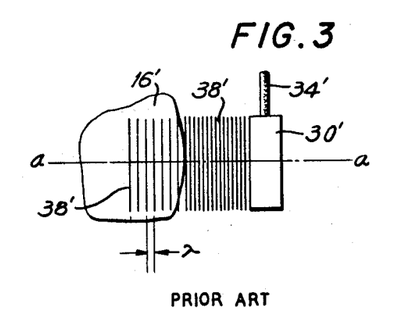
FIG. 3 is a view similar to FIG. 2 which illustrates the process as practiced by the prior art.
Figure 3A:
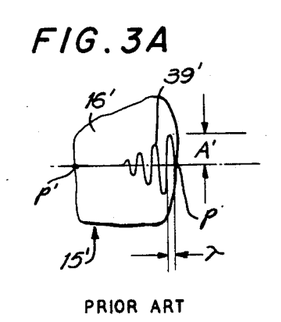
FIG. 3A is a view similar to FIG. 2A which illustrates the process as practiced by the prior art.

For a clearer understanding of the present invention a brief discussion of the prior art method of treatment is provided in conjunction with FIGS. 3 and 3A, which show similar cross-sections of an organic element 16' as shown as in FIGS. 2 and 2A respectively, except that the elastic wave pattern 39' is of a different form which results in a substantial heating of the organic structure 15' as it passes therethrough.

The prior art as briefly illustrated in FIGS. 3 and 3A, makes use of the phenomenon of the high absorption coefficient of high frequency mechanical or elastic waves, the elastic wave energy is rapidly dissipated into thermal energy and the effects produced are mainly due to temperature rise in the hard and soft tissues. Muscular areas of the body are made up of alternate layers of fatty tissue, connective tissue and muscle fibre in the form of the cells 17'. These layers are interpersed and separated by minutely thin layers of fluid 18'. Each of these substances has a slightly different speed of sound conduction. Therefore coupling is somewhat less than perfect at each interface. Thus, small amounts of the sound energy are reflected back from each interface and converted to heat. This heat is deposited locally, in the path of the sound beam and distribution is fairly even in all tissue which the beam penetrates.

Thus, when the elastic waves 38' are transmitted from the fluid medium 21' through the cellular structure 17' along line a—a, at a frequency in the order of 1,000,000 c.p.s., the amplitude of vibration A' of the wave 39' entering the portion 16' of the organic structure decreases in amplitude and we have a high absorption over the distance p–p' of the elastic wave 38'. Due to this conversion, the elastic waves 38' do not pass through the organic structure but terminate therein and substantially raise the temperature level of the organic structure. This also prevents their possible use for a multiple treatment of the organic structure.

Additional discussion of the concepts of the present invention, and distinguishing characteristics between the prior art and the present invention are contained in the discussion that follows below.

In order to understand the nature of the broad invention involved here, it is necessary to see in detail how the frequency of an elastic wave relates to the sizes of the organic structures involved in the path of said wave.

The terms organic "structure" and organic "substructure" are used herein to point out that both an entire biological system, i.e. human or a portion thereof, i.e. heart, both may be treated in accordance with the invention. Therefore, in the specification, including the claimed invention, the terms may be used interchangeably.

A plane wave of longitudinal vibrations is sufficiently typical to illustrate the points desired. Of course, such a wave will have one frequency, $f$, but a different wave length, $\lambda$, for each substance it traverses. When traversing a medium the speed, $c$, of the wave equals $f \times \lambda$ and is also equal to $\sqrt{E/p}$ ($E$=Young's modulus, $p$=density). Furthermore the displacement, $\epsilon$, of any point in the medium from its normal equilibrium position is given by the equation $$\xi = \xi_0 \sin 2\pi \left(\frac{t}{\tau} - \frac{x}{\lambda}\right)$$

So we see that the disturbance created by the wave in the medium is simple harmonic vibration both in time and space. If we select a specific time, $t_0$, then we have $$\xi_1 = \xi_0 \sin 2\pi \left(\frac{t_0}{\tau} - \frac{x}{\lambda}\right)$$

So at this fixed time $$\xi = \xi_0 \sin 2\pi \left(\frac{t_0}{\tau}\right)$$

at $x=o$ and at $x=d$ $$\xi_2 = \xi_0 \sin 2\pi \left(\frac{t_0}{\tau} - \frac{d}{\lambda}\right)$$

From this last equation it is clear that when $d=n\lambda$ where $n=1, 2, 3, \ldots$ we have $$\xi_2 = \xi_2 \sin \left(2\pi \frac{t_0}{\tau} - 2\pi\tau\right) = \xi_0 \sin 2\pi \frac{t_0}{\tau} = \xi_1$$

So the value of $\xi_1$, repeats itself in space for a fixed time, $t_0$, at spaced distances of one wave length each. This means that between $x=o$ and $x=\lambda$, $\xi_1$, goes through one complete cycle of phases. Now, on the other hand if we fix the $x$ coordinate at $x=d$, then $$\xi_3 = \xi_0 \sin 2\pi \left(\frac{t}{\tau} - \frac{d}{\lambda}\right)$$

and we see that $\xi_3$ goes through a complete cycle of phases as $t$ varies from 0 to $\tau$. The quantitative relations are $$\tau = \frac{1}{f} \lambda = \frac{c}{f} = c\tau$$

The strain on the medium is $$-\frac{\partial \xi}{\partial x} = s$$

and the excess local pressure (or tension) is $p=Es$
And $$s = -\frac{\partial \xi}{\partial x} = +\left(\frac{2\pi\xi_0}{\lambda}\right) \cos 2\pi \left(\frac{t}{\tau} - \frac{x}{\lambda}\right) = s_0 \cos 2\pi \left(\frac{t}{\tau} - \frac{x}{\lambda}\right)$$

When we see that both $p$ and $s$ are 90° out of phase with the displacement.

Suppose we are dealing with a situation of an organic structure 15 of linear length $b$, in the path of the wave. Then we may have three general cases, namely $b/\lambda \ll 1$, $b/\lambda \simeq 1$, $b/\lambda \gg 1$, (or $b \ll \lambda$, $b \sim \lambda$, $b \gg \lambda$).
But we may write for the strain difference over the length, $b$, as follows:

$$s_1 - s_2 = s_0 \cos 2\pi \frac{t_0}{\tau} - \cos 2\pi \left(\frac{t_0}{\tau} - \frac{b}{\lambda}\right)$$

$$s_1 - s_2 = s_0 \cos 2\pi \frac{t_0}{\tau} \left(1 - \cos 2\pi \frac{b}{\lambda}\right) - \sin 2\pi \frac{t_0}{\tau} \sin 2\pi \frac{b}{\lambda}$$

This expression may be examined for maximum strain change across the distance $b$ (the length of the organic substructure).

For $b \ll \lambda$ we get $$\left(\frac{s_1 - s_2}{s_1}\right) \max = 1 + 4\pi^2 b^2 / \lambda^2$$

For $b \sim \lambda$ we get $$\left(\frac{s_1 - s_2}{s_1}\right) \max = 2 \text{ for } b = \lambda/2$$

For $b \gg \lambda$ we get $$\left(\frac{s_1 - s_2}{s_1}\right) \text{ is a max. for } b = \left(n + \frac{1}{4}\right)\lambda$$

where $n$ is a whole number.

Figure 4A:
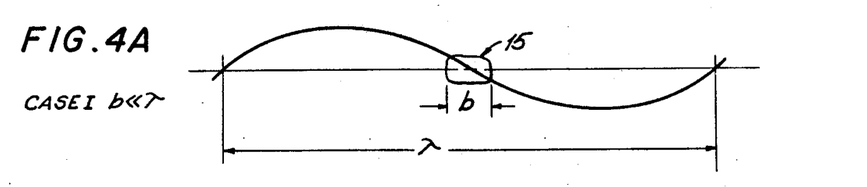
FIGS. 4A, 4B and 4C are schematic illustrations of the treatment of organic structures at different frequencies of vibration to help explain the theory of the invention.
Figure 4B:
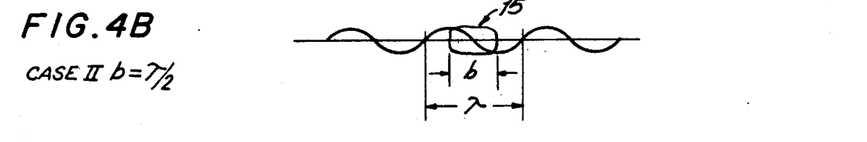
Figures 4C, 5:
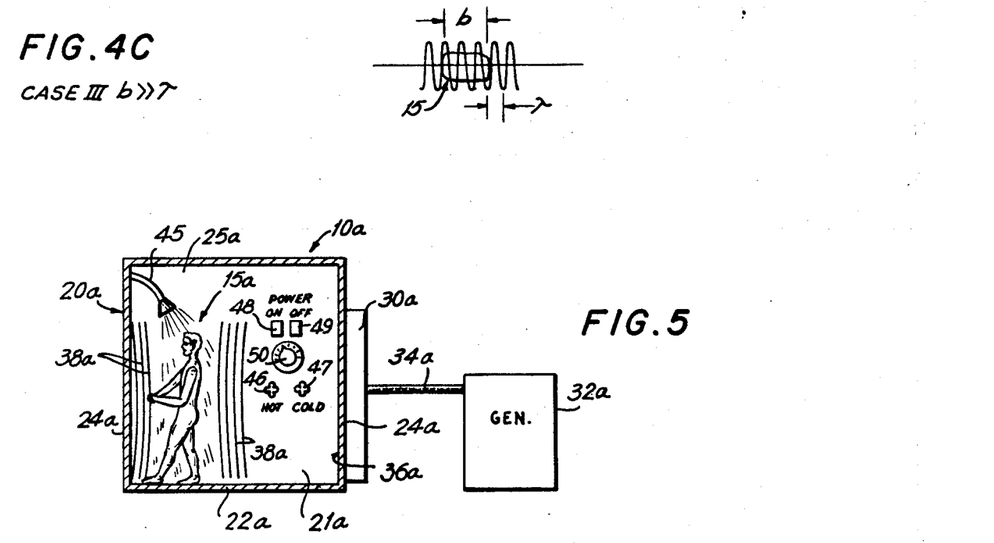
FIGS. 5, 6, 7 and 8 illustrate various forms of acoustic auditoriums designed primarily for the treatment of animals with coherent elastic energy waves during which time they are engaged in other activities.

Looking at the wave in the medium for time $t = t_0$ and considering the three cases we really have graphically, for an organic structure or substructure sitting at a region of maximum strain, what is illustrated in FIGS. 4A, 4B and 4C. Case 1 being illustrated in FIG. 4A, case 11 in FIG. 4B and case 111 in FIG. 4C.

Clearly for the same size structure, $b$, case 1 corresponds to a low frequency, while cases 11 and 111 correspond to progressively higher frequencies. In case 1 the maximum strain variation over the organism is relatively small. In fact, in the limit we approach the case where it moves essentially as a unit.

Case 1 is analogous to a cork bobbing on the water as water waves pass by. But case 11 is more like the motion of a good sized boat caught in ocean waves. While some of the boat is in a trough, some is, at the same time, at a crest. This causes severe strains on the boat and under bad conditions it may even break up. In case 111 a number of strain reversals occur in a single substructure and so we will find at one time compressions and tensions present at the same time in different parts of the organism.

To get a feeling for orders of magnitude, let us consider soft tissue in an animal. The speed of the waves, $c$, is about 1590 m./sec. Then we get

TABLE I

[$f$ and $\lambda$ for $c = 1590$ m./sec.]

| $f$ c.p.s. | $\lambda$ cms. | $\lambda/2$ cms. |
|---|---|---|
| 500 | 318.00 | 159.00 |
| 5,000 | 31.80 | 15.90 |
| 10,000 | 15.90 | 7.95 |
| 20,000 | 7.90 | 3.95 |
| 40,000 | 3.97 | 1.99 |
| 80,000 | 1.98 | 0.99 |
| 100,000 | 1.59 | 0.80 |
| 200,000 | 0.79 | 0.40 |
| 400,000 | 0.39 | 0.20 |
| 600,000 | 0.26 | 0.13 |

Now, just what happens mechanically to a structure, $b$, when it moves to and fro as a whole, with a minimal strain difference within the structure? Clearly, the structure is not stretched or compressed very much, but instead just oscillates with an amplitude $\xi_0$ at a frequency, $f$. This corresponds to an acceleration.

$$A \text{ peak} = 4\pi^2 f^2$$

If we measure $\xi_0$ in microns we can compute the value of $a/\xi_0$ in $g$'s per micron.

TABLE II

| $f$ (c.p.s.) | A peak (g's/$\mu$) | $2\pi\xi_0/\lambda = S_{\max}$ (appx.) |
|---|---|---|
| 500 | .94 | $2 \times 10^{-6}$ |
| 5,000 | 9.4 | $2 \times 10^{-5}$ |
| 10,000 | 18.8 | $4 \times 10^{-5}$ |
| 20,000 | 37.6 | $8 \times 10^{-5}$ |
| 40,000 | 75.2 | $16 \times 10^{-5}$ |
| 80,000 | 150.4 | $32 \times 10^{-5}$ |
| 600,000 | 188 | $4 \times 10^{-4}$ |
| 100,000 | 376 | $8 \times 10^{-4}$ |
| 200,000 | 752 | $16 \times 10^{-4}$ |
| 400,000 | 1,028 | $24 \times 10^{-4}$ |

Table 11 shows the equivalent alternating gravitational field the structure, $b$, experiences for a 1 micron amplitude of vibration. Above 5,000 c.p.s. this acceelration field is greater than a human organism as a whole can withstand. This kind of shaking alone can stimulate secondary vibrations on the substructure and thus provide beneficial stimulation. However, this is the sort of stimulation (in kind) which is provided by the numerous types of low frequency vibrations currently in use. I refer to vibratory platforms for foot relaxation, and vibratory beds and chairs, also used for general body relaxation. Then there are hand held vibrators such as used by barbers and also for home use in treating tensed muscles, headaches and the like.

But, even at this level ($b \ll \lambda$), we must remember that the substructure, $b$, may be only a small fraction of the organism. For example, if $b$, corresponds to a single cell, then the organism will present a whole chain of cells to the incoming elastic wave, and if the length of the chain is $nb$ ($n$ = large whole number), then this chain, considered as a structure, $b'$, will correspond to either case 11 or case 111 whereby substantially local alternating stresses may be stimulated in the structure, $b'$. Thus, it may be seen that the methods contemplated in this invention include an enormous versatility in manipulating inner organs at will. In this art we are not contemplating vibrating the body as a whole, as is done with the low frequency vibration method mentioned above. Such vibrators are in the 60–120 c.p.s. class.

Now, as we approach the situation in case 111 ($b \gg \lambda$) we can approach the situation where, within the substructure, $b$, many alternations of stress occur. That, is, the structure, $b$, is set into a vibrating state involving compression followed by tension, followed by compression, followed by tension all within the linear path of $b$, which is parallel to the elastic wave. Without going deeply into absorption theory, it is sufficient to point out here that the higher the number of such alternations there are for a single substructure, $b$, the greater will be the conversion of the elastic wave energy into thermal energy thereby heating the organism.

This is a range, in which, also, is not contemplated in this invention. This art, which is commonly practiced today by the medical profession, is essentially a method for selectively heating organic structures, especially bones and bone marrow in the treatment of such conditions as rheumatism, arthritis, bursitis, etc. I mention bony structures because at high frequencies of ultrasonic vibration, hard tissues have much higher absorption coefficients than soft tissues. In fact, it is possible to heat bone marrow on a selective basis, which, for example, is not possible for diathermy techniques. The frequency range used for this selective heating by means of ultrasonic elastic waves is generally 1 mc./sec. or higher. Again let it be emphasized that the broad scope of this invention does not contemplate the use of this high frequency range.

This is because it is of the essence of the invention to provide coherent elastic wave energy either pervasively or selectively to organic structures. The frequency ranges employed in each case are selected so that coherence of the energy is mainly preserved, while only a relatively minor portion is converted into incoherent or thermal energy.

In order to understand this for complex structures such as the human body, it is necessary to emphasize that a beam of elastic wave energy will attenuate generally due to two effects, these are:

(1) Scattering or deflection of the elastic wave.

(2) Absorption of the elastic wave with conversion to thermal energy.

Now, with respect to 1, we have a situation similar to that found in any architectural acoustic auditorium problem. One gets repeated reflections, echoes, reverberations, etc., which result in a complex pattern of coherent elastic wave energy distributed throughout the auditorium. All of this energy will produce mechanical vibration effects on the various parts of the organism in accordance with the principles obtained in the foregoing analysis. Just as it is well known that architectural acoustics is extraordinarily complex, so it is with the patterns set up in a complex organism by means of incident elastic waves. However, as we shall see, if the substructures present, namely, $b_1, b_2, \ldots b_n$, are "diagnosed" as to size and location (this may be done with X-ray, ultrasonograph or any other suitable diagnostic technique), then it is possible by "tailoring" the elastic wave generator to provide selective coherent energy inputs into desired locations. We will give examples of this below.

As to 2, we always select elastic waves of a frequency range such that thermal absorption effects are held to a minimum. In other words the frequency ranges chosen are such that the organism is essentially "transparent." This means that in any homogeneous substructure, $b$, the input elastic wave traverses the substructure with only a small amount of conversion to thermal energy, such that the therapeutic effects produced are due primarily to a sort of "micromassage."

Thus, we have ruled out the very low frequency vibrators, generally in the 60/120 c.p.s. range and the very high frequency range above 1/mc./sec. It is precisely the discovery of the low ultrasonic frequency (which includes a significant portion of the sonic range) range and their coherent wave energy effects which constitute the heart of the invention. This came about because the applicant has pioneered in this so-called low ultrasonic frequency range for many years and has demonstrated through the numerous patents issued to him, that he has a deep understanding of the many effects which are uniquely producible both in the industrial and biological fields by various kinds of this type of wave energy.

Applicant is not unaware of the beneficial results arising from the use of the 1 mc./sec. range in producing thermal effects primarily. In fact, by control of the low frequency range in a proper technological manner, it is possible to produce thermal effects of considerable magnitude in the low frequency range. This is possible by using shear waves of low frequency instead of longitudinal or compressional waves, such as we have been discussing so far. Shear waves have a very high absorption coefficient for soft organic strains. In fact applicant has employed such effect in the invention of the ultrasonic knife whereby the rubbing action of the ultrasonic vibration of the knife edge may be controlled so as to produce bloodless surgery. Such a technique is extremely safe and superior to ordinary bloodless surgery with electric cautery, because the high absorption coefficient of the shear waves produced restricts the damaged cells, to a very thin superficial layer. This marvelous property of the low frequency range, contemplated in this invention, whereby shear waves will not propagate to any appreciable distance, while longitudinal waves pass through homogeneous parts of the structure very much as light waves traverse glass, is unique and indicates the flexibility and versatility of the broad treatment methods contemplated herein.

Another note of importance in this field relates to the fact that the low frequency range of interest to this invention has already found numerous biological applications. However, a perusal of the art will show that most of the effects produced have been due to the destructive properties of low frequency waves of high intensity. The destruction of cells and the preparation of serums and other useful destructive effects are attributable to the "cavitation" produced in the fluids in which the organic structures are immersed. The methods contemplated by this invention specifically avoid just this phenomenon of cavitation and, in fact, in all cases utilize cooperating equipment monitored so that non-cavitating coherent elastic waves of compression and rarefaction are introduced into the treatment area. The entire aim of the present invention is to use the elastic wave energy indicated for beneficial treatment purposes ranging all the way from simple physio-therapy, which may be practiced at home or at a physiotherapist's office, to medical courses of treatment handled by competent medical personnel to relieve or cure specific maladies. The goals of the treatment methods contemplated will vary very much, depending for example, on the problem. The task of benefiting plant growth both as to rate of growth and size attainable; the task of treating either botanical seeds, or the zoological seeds (such as eggs and embryos in utero), the task of treating a specific organ in a complex structure such as an animal or a human being, the task of general low level irradiation of organisms for the purpose of raising the general "tonus" of the organism and the health and resistance to disease. All these tasks are different in kind, yet fall under the same generic technique of this invention. Also, in each case, different arrangements and designs of associated equipment are necessary to the accomplishment of the goal.

Perhaps the most general principle, discovered by the applicant, which illustrates the great power of the methods contemplated, may be stated as what he calls the Thermal Equivalence Principle. The principle asserts in effect that the kinetic energy of the basic particles of an aggregate may consist of both coherent and incoherent components and the coherent components are capable of producing effects similar to those produced by elevated temperatures, except that the coherent energy does not raise the temperature. Thus, it is possible with coherent elastic wave energy to produce at room temperature results which normally require high temperature. Industrial examples of this are found in ultrasonic welding of metals and plastics, in forming, extruding and drawing metals, and in low temperature insertion of metal into plastic parts. Applicant is either an inventor or co-inventor in all these areas which have proven industrial usefulness.

When the same idea is carried over to the biological structure we have the extraordinary possibility of treating an organism with coherent elastic wave energy and thereby producing effects corresponding to high temperatures, but which don't eventuate because of the transparency of the organism to the frequency range employed. In these cases there is the uniquely new feature, that at the equivalent high temperature range the organism would be destroyed and could not therefore exist. But by utilizing coherent wave energy this lethal temperature rise is avoided and it is possible to introduce greater levels of elastic energy into organs than was ever before possible. In the high ultrasonic frequency range for example, very high intensity levels of elastic energy are used only when it is a question of performing ultrasonic surgery as in the destruction of small brain tumors. It is the high absorption of the high frequency wave which does the job in this case.

So, I believe the stage is now completely set, whereby applicant has described the general principles adequately to show the differences from the prior art of the novel methods contemplated herein.

In the case of the treatment of a specific organ or substructure, $b$, it is generally preferred to be in the frequency range of case 11 ($b \sim \lambda$). In fact, maximum stress variation over the organ involved will occur for $b = \lambda/2$. Suppose, for example, it is desired to stimulate the heart of an animal. With the aid of an ultrasonograph (well known to those skilled in the art) it is easily possible to obtain a three-dimensional image of the organ. Suppose the linear dimension in the direction of propagation of the elastic wave to be used, is 2 inches. This is 5.08 cms. If this taken as $\lambda/2$, then from Table 1, a frequency of about 17.1 kc./sec. is indicated as producing the maximal stress differential across the heart. Irradiation at this frequency will then produce a most effective "massage" of the heart with the associated benefits accruing from this treatment. If one wishes to be still more selective, a "white sound" generator may be employed to irradiate the heart region of the animal in the direction in which treatment will later be introduced. A pick up scanning receiver of the white sound may be displayed on a panoramoscope spectrum analyser. Study of the spectrum in the 17.1 kc. region will show absorption maxima which correspond to the heart acting as a sonic energy wave trap. Once this frequency band is determined, the introduction of corresponding longitudinal elastic waves will "oscillate" the heart. By suitable low-frequency amplitude modulation of the treatment waves, it is even possible to cause the heart to oscillate in addition to the high frequency (or carrier wave) at its normal natural rhythm. Thus applicant's method may be likened to a technique for non-destructively entering live organisms with elastic carrier-waves and then with these "invisible elastic fingers" mechanically affect desired organs in the body. It is certainly obvious that just this technique alone reveals the extraordinary possibilities inherent in the broad coherent wave energy methods contemplated in the invention.

Then, again consider bony structures such as the vertebrae of the spinal column or the many small bones found in the various body joints. With coherent elastic wave energy it is possible to "loosen" and temporarily "lubricate" the bony junctions involved. In general it is known that coherent elastic wave energy, due to the Thermal Equivalence Principle, can cause significant reduction in the viscosity of body fluids and also reduce friction of contiguous joints.

Another example of the present invention, which may be practiced with the apparatus of FIG. 1, is the daily irradiation, at a pre-selected frequency, of the growing embryo in vivo, say, a human, cow, pig, sheep, etc. The change in size of the embryo will call for a progressively longer wave length of elastic energy and this may be easily determined by ultrasonograph, with which the linear dimension of the embryo may be safely determined (not so with X-rays). This treatment may begin when the organic structure is in the form of a fertilized ovum.

The examples so far cited are merely by way of indicating techniques suitable for the preferential treatment of specific organs. However, there is still the broad physiotherapy field whereby the treatment of substantially the whole organism is contemplated for the generally beneficial results arising from raising the "tonus" of the individual or otherwise affecting him as a whole. This technique calls for a tank or enclosure whereby the individual to be treated, is submerged in a fluid medium and every effort is made to match the elastic wave generator to this medium, which in turn provides efficient introduction of coherent wave energy into said individual. When such a technique is employed, it is preferred to frequency modulate the elastic waves so that there will not be any continuous resonant stimulation of specific organs. In this way the whole organism may be benefited, and when any particular organ receives a resonant frequency dosage, this will be of such short duration that there is an ample resting time between cycles of modulation.

Further, in such cases, there are those instances where it is desired to modulate the carrier wave energy in accordance with some harmonious pattern, such as is typified, for example, by music. For example, a patient submerged in a bath tub of warm water, being irradiated by modulated ultrasonic elastic waves such that the modulation will produce pre-selected musical compositions, will have psychosonic benefits added to the general toning up stimuli. If the patient is a depressed individual in a mental hospital, then the music should be calculated to lift him out of the depressive state. It must be appreciated that music received in this way throughout the organism is a completely different phenomenon than the usual method of listening to aerial acoustic vibration.

It is further evident that, if the patient were in an overexcited state, the modulation should be altered so as to produce music which is soothing and restful. This is completely in line with techniques currently used, whereby colors are utilized to aid in altering the mood of a patient in a desired direction.

These same techniques may be extended and combined with colors through the use of swimming pools, and other special enclosures for general over all beneficial micromassage to individuals. An interesting variant in this area is the adaptation of a fish tank so that an elastic wave generator may be used to irradiate the fish in the tank, especially with musical vibration, which attract the fish and produce under water swimming maneuvers. In connection with plant life, hydroponic farming presents a very favorable situation for the novel methods herein disclosed. Fairly high frequencies are employed during the germination period of the plants. Then as the plants grow progressive reductions in frequency are employed in order to maintain a high level of stimulation in the larger plant section.

ADDITIONAL FORMS OF THE INVENTION

As illustrated herein above, various means are available for determining both the frequency band and range of the coherent elastic energy waves in the treatment of organic structures. It is appreciated that other techniques may be employed to select the frequency and the pattern thereof in practicing the invention.

In FIGS. 5–9, I illustrate additional ways in which the invention may be applied to animals and particularly humans. This may be accomplished while the humans are engaged in their normal every day activities for example, taking a shower, being entertained in a theatre, swimming in a pool or just eating or sleeping in their home. Since in most cases, for humans, the frequency of vibration will be above the audible range of their hearing, there is no need for noise suppressors. If it is found that for the treatment of a specific organ or part of the body it responds best to a lower frequency, i.e. 5,000 c.p.s., then ear plugs may be worn by the person being treated.

FIG. 5 illustrates a form of the invention 10a in which the acoustic auditorium 20a is a shower having spaced apart side walls 24a, a rear wall 25a and a bottom 22a, forming a water proof enclosure with water supply means in the form of conduit 45 and controlled by valve means 46 for the hot water and valve means 47 for the cold water. The human 15a after entering the shower manually engages the switch means 48 to the "ON" position and causes the generator 32a to operate. Current passes through cable 34a to the transducer means 30a and the latter is coupled to the shower wall 24a so that the latter will vibrate as a biosonic wall 36a and transmit energy waves 38a via the elastic medium 21a, primarily air, to the human 15a. The coherent elastic waves which pass through the human are then reflected by the opposite wall 24a for a secondary treatment.

The frequency of vibration may be controlled by the person taking the shower by adjusting the frequency control means having knob 50 contained within the shower for the adjustment. The switching means and frequency control are wired to the generator in any conventional manner. The frequency of vibration is preferably modulated over a given frequency range to prevent a foci of energy in a given area and to be assured that the energy penetrates pervasively into the accoustically accessable inner regions of the body. Since the biosonic wall 36a is also of a large area various patterns of loops and nodes will appear, by varying the vibration pattern of the wall, stresses which might fatigue and crack the biosonic wall 36 are prevented. The "OFF" switching means 49 is activated when the person is done showering.

Although the vertical side walls 24a are generally illustrated as having the transducers coupled thereto, it is appreciated that the floor and ceiling are also walls of the acoustic chamber. Thus, the transducer may be mounted behind or beneath the ceiling or beneath the floor of the chamber since these are also walls within the defined invention.

Figure 6:
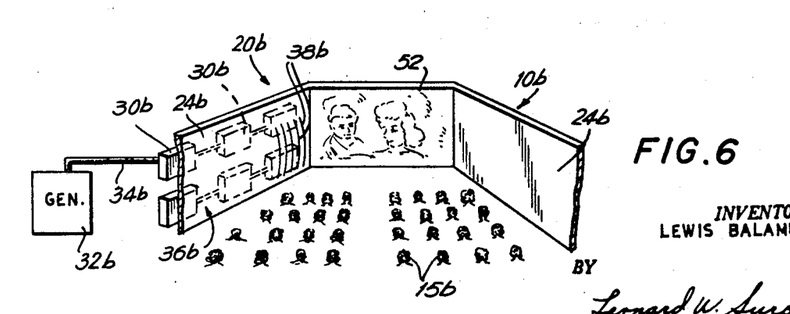

FIG. 6 illustrates another form 10b of the invention for treating a great number of organic structures, such as humans 15b, in an acoustic auditorium 20b in the form of a theatre. While the humans 15b are busily involved in the show or motion picture on the stage or screen 52, they are receiving coherent elastic energy waves for the treatment of their bodies. For example these elastic energy waves can be selected to produce an effect that might complement the attraction on the stage or movie screen.

The elastic waves 38b within the acoustic auditorium 20b are emited by a plurality of transducers 30b, which are wired together by cable 34b, which in turn is connected to the generator 32b. The wall 46 acts as our biosonic wall 36b and is of sufficient area to transmit elastic waves across the auditorium for treatment of the humans therein. The opposite wall 46 may act as a reflector.

Figure 7:
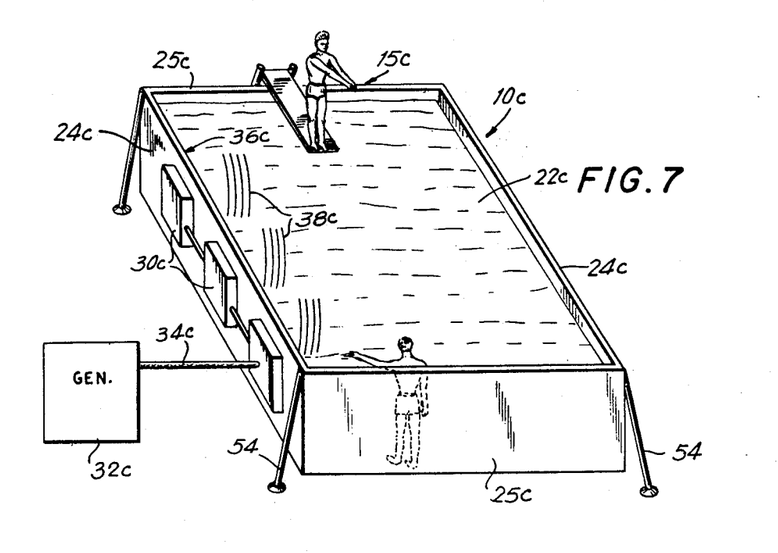

FIG. 7 is another form of the invention 10c, in which the humans 15c illustrated may be engaged in another activity during the treatment period. The acoustic auditorium 20c may be in the form of a swimming pool having a bottom 22c, front and rear walls 25c and side walls 24c. Support legs 54 may be provided to support the swimming pool.

The transducers 30c are mounted on one of the side walls 24c and when the generator 32c is energized and the current flows through cable 34c to the transducers, the side wall 24c acts as a biosonic wall 36c to transmit elastic waves 38c through the elastic medium 21c which is primarily water. The elastic waves may then be reflected of the opposite wall of the pool for a secondary treatment. The walls of the swimming pool may be made of any material capable of vibrating in the ultrasonic frequency range as for example, metal, glass, plastic or even concrete.

Figure 8:
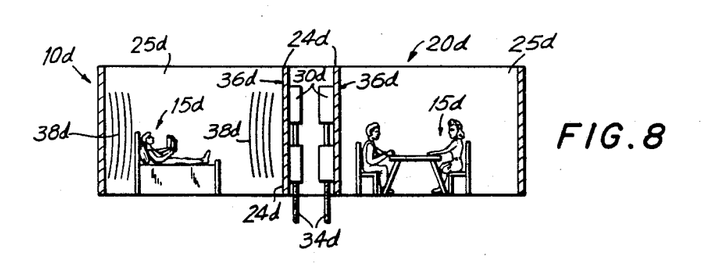

FIG. 8 illustrates the invention 10d as it applies to the home in which the organic structures 15d may be humans and pets. Since the coherent elastic waves are silent we can conduct our normal activities and still receive the beneficial effects of the micromassage of the body. The acoustic auditorium 20d may consist of a room having front and rearwalls 25d with side walls 24d. The transducers 30d may either be in the room or mounted on the walls and connected together by means of cables 34d. In one room we see a human asleep and in another at a table, both carrying on their normal functions.

Figure 13:
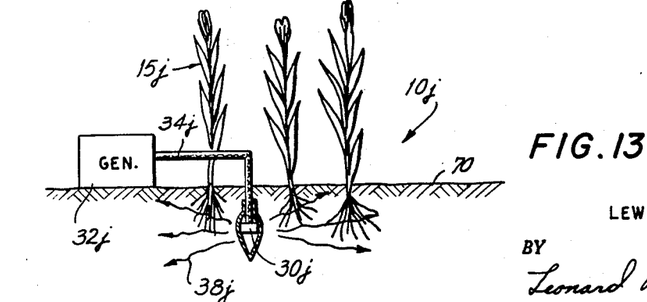

In accordance with the invention there is also the class of elastic wave transducers which are essentially used as treatment devices, while being inserted into a medium through which it is desired to pass coherent wave energy to the desired organic structure. Such devices can range from an enema tube fitted with a contoured tool for transmission of the coherent wave energy to the hardened body wastes, as is found in constipation and illustrated in FIG. 9, to large cultivators such as are used on farms, whose prongs supply the elastic wave energy to the soil during central cultivation and as illustrated in FIG. 13. Also such insertion wave transducers may just be planted beneath the soil for either continuous or periodic treatment of areas containing growing plants.

Insertion wave transducers for the sea are essentially like sonar wave transducers except that they are preferably operated on a continuous wave basis. However, such transducers are preferably combined with submerged specially placed partitions which serve to create an undersea acoustic auditorium within which sea life may be treated with elastic coherent wave energy. Along this same line conduits or ducts may be used to feed through sea life of various kinds which will during passage receive a prescribed intensity of coherent elastic wave energy. Incidentally, insertion type wave transducers may also be extremely small as in the case of the dimension of a very small size hypodermic needle. The vibrating needle may be small enough to penetrate a single cell organism and thereby inject coherent wave energy within the confines of the cell. Of course, this enables one to establish the specific site of energy injection, but of course some of the energy flows into the surrounding medium since the cell membrane will not prevent the passage of elastic waves. The purpose of such treatment is completely opposite to the usual use of low ultrasonic frequency waves of high intensity, which are used to completely destroy cells and microscopic biological entities for the purposes of making extractions and other tests. In our case as in all others the intensity is maintained below cavitational levels on the biological materials involved. This aim is, rather, beneficial stimulation, preserving the organism intact and with improved life functions.

Any cavity of an animal body (including human) which may be safely filled with liquid (as for example in stomach X-raying procedures) may at the same time receive an insertion wave generator for coherent wave energy treatment of the walls of the organic cavity. The size of the wave generator is proportioned so as to permit entry into the cavity through one of the openings in the oral and nasal cavities, including the sinus and other accessible cavities on the body.

Figure 9:
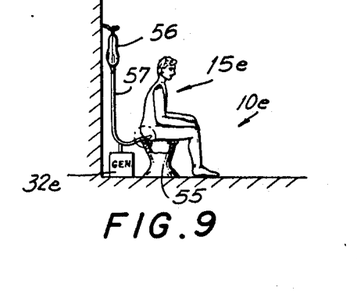
FIGS. 9 and 9A are views showing another embodiment of the present invention adapted for the treatment of humans.
Figure 9A:
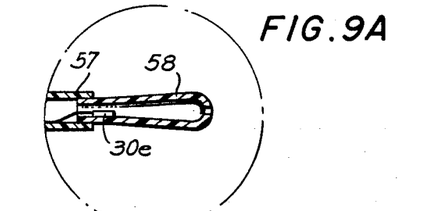

FIG. 9 illustrates form 10e of the present invention used for reducing the effective viscosity of hardened body wastes in the intestinal tract. The coherent wave energy is coupled to the human 15e by direct contact. The transmission might occur when the human 15e is seated on a toilet stool 55. An enema assembly 56, of general known description, having a tube 57 extending therefrom and coupled to a contoured tool 58, as illustrated in FIG. 9A, adapted to be inserted in the rectum of the human. The tool 58 may be made from plastic or metal capable of a high transmission of ultrasonic vibrations. Secured to the wall of the tool 58 is a transducer 30e small enough in size to be contained therein. The transducer 30e in turn coupled to a generator 32e. When the tool 58 is inserted within the human 15e the coherent vibrations will be transmitted to the intestinal tubes and reduce the viscosity of the hardened body wastes.

Other forms of ultrasonic transducers may be employed to vibrate the tool 58, as for example the devices illustrated in U.S. Patent Numbers 3,086,288, 3,075,288 and 3,075,904 previously referred to.

Figure 10:
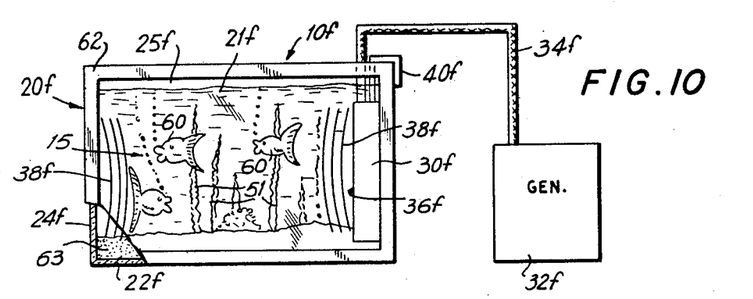
FIG. 10 shows another form of an acoustical auditorium designed to treat underwater creatures and plants.

In FIGS. 10–13, I illustrate various ways in which the invention may be applied to underwater life and plants in various stages of development. The embodiment of the invention 10f, illustrated in FIG. 10 is similar in nature to that of FIG. 1, except that the form of the organic structures being treated are different, and the undersea acoustic auditorium 20f, contains organic structures from the fish family 60 and plant family 51.

It is contemplated that the biosonic wall 36f contained therein could as easily be placed in a lake, pond, stream, river, ocean, or any form of enclosure containing therein specimens of the fish family 60, plant life 61, separately or together and is not limited to an aquarium but merely illustrative of the broad concept of the invention. The acoustic enclosure 20f is in the form of an aquarium having a rectangular frame 62 with glass side walls 24f and front and rear walls 25f, with a bottom 22f. The plants 51 are supported in sand or gravel 63 on the bottom of the aquarium.

The elastic medium 21f is water and the coherent elastic waves 38f are propagated through the water by means of the biosonic wall 36f which is vibrated by transducer 30f and the latter is supported within the aquarium by support means 34f in the form of a bracket. The oscillation generator 32f is connected to the transducer 30f by means of the power cable 40f. Particularly since we are subjecting various species of organic structures to the acoustic wave energy 38f, it is desirable that the frequency of vibrations is selected in a range such that we obtain the transmission of the coherent elastic wave energy through the fish 60 and plants 51 with a minimal conversion of the energy to heat. Since for plants and fish we are not concerned with the audible frequency as much as in humans, the frequency range may be in the order of 500 to 600,000 cycles per second. Tests can be conducted for various specimens of plants 51 and fish 60, to first determine the critical frequency range as to the cavitational threshold and the conversion to thermal energy. Once this is determined the home unit for the aquarium can be set for the proper frequency, or suitable frequency patterns, to stimulate the growth of fish and plants in enclosures of various forms.

Figure 11:
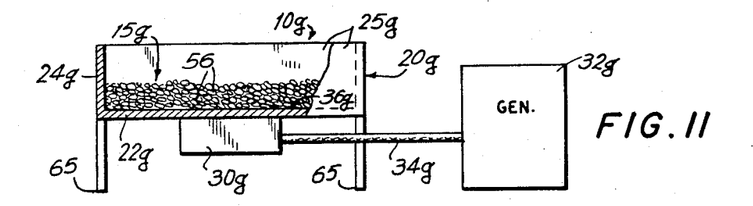
FIGS. 11, 12, and 13 illustrate other forms of the invention designed to treat plant or other life during varying stages of their development.

FIG. 11 illustrates another embodiment of the present invention 10g, in which it is desirable to treat quantities of organic structures 15g, such as seeds or eggs. The acoustical auditorium 20g is supported on legs 65 that are of sufficient height to permit the coupling beneath it of the transducer 30g. The power cable 40g is connected to the generator 32g. The enclosure 20g is open on the top to permit the insertion nad removable of the organic structures. Side walls 24g and front and rear walls 25g which are joined together by a bottom 22g which acts as the biosonic wall 36g of the acoustical auditorium 20g. By coupling the transducer 30g to the underside of the bottom wall 22g it is possible to vibrate the entire biosonic wall 36g so that all of the organic structures may be treated at one time.

The organic structures 15g illustrated, are seeds 56 that are placed in the acoustic auditorium 20g for treatment. The stimulation is provided in the form of coherent elastic waves which pass through the seeds 56 and are intended to stimulate them, so when planted they will germinate in a reduced period of time, as compared to those not treated, and grow into a healthier plant, tree etc. The elastic waves are modulated over a selected frequency range to distribute the energy since loops and nodes of vibration would otherwise tend to exist on the biosonic wall 36g.

Figure 12:
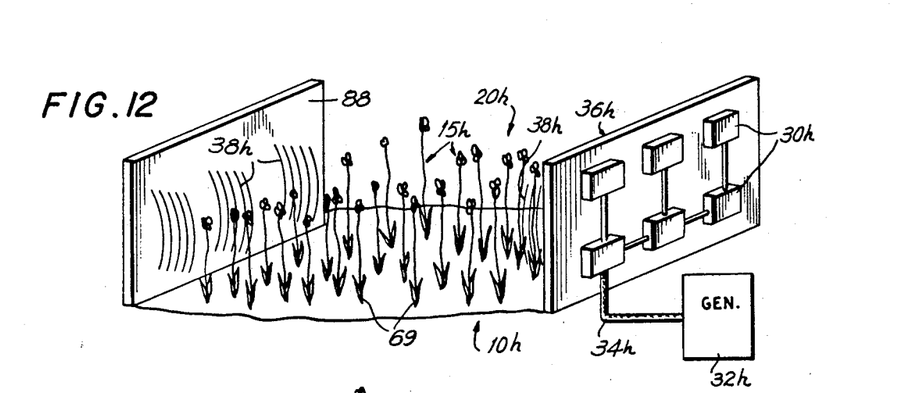

FIG. 12 illustrates another embodiment 10h of the invention wherein the biosonic wall 36h is of sufficient size to treat large areas with the high frequency elastic waves 38h. A variety of organic elements 15h such as trees and plants may be treated in open fields in which the acoustical auditorium 20h is formed by vertically maintaining a biosonic wall 36h in spaced relation to a reflecting wall 68. A plurality of transducers 30h are coupled to the biosonic wall 68 and the cable joins them together and in turn is connected to generator 32h. The biosonic wall is simply a plate such as metal, hard plastic or glass with the transducers 30h coupled to one side thereof. Although one transducer 30h may be employed, for certain size walls more than one is preferable. The walls 36h and 68 are in spaced relationship to each other and may be anchored to the ground in any conventional manner not shown. The organic elements 15h illustrated as plants 69, are contained between the walls.

As the generator 32h supplies to the transducers 30h a continuously variable frequency signal, the biosonic wall 36h will respond at a number of flexural resonance points. The frequency range may be in the order of 500 c.p.s. to 600,000 c.p.s. The lower frequency which is audible is only desirable for remote areas. The transducers 30h may be in the form of loud speakers for some of the applications in the lower range. As previously explained with respect to humans the criteria on minimal conversion to heat of the elastic waves and that they pass through the plants 69 is important.

FIG. 13, illustrates a form of the invention 10j in which the coherent elastic energy waves 38j are transmitted through the soil 70 which acts as the fluid medium through which the waves travel to the roots of the plants 15j.

The transducer 30j is inserted into the soil 70 and energized by generator 32j which is coupled to the transducer by conduit 34j. The transduced may emit compressional waves in a radial mode of vibration in a plane substantially parallel to the surface of the earth to obtain a more dispersed wave to treat a greater area at a given time. The generator 32j may be modulated as to both frequency and time of the day. For example it may be desirable to treat the plants only during the daylight hours.

From the above disclosure, it is evident that the area or size of the biosonic wall will vary with the particular needs for a specific application. It is contemplated the wall may be one half inch square or smaller for the treatment of micro organisms, or be the size of the entire wall of a theatre, room, shower, bathtub, swimming pool, acquarium etc., for the treatment of macro organisms. Since the elastic medium may be air the treatment of a host of animals may occur while they are busily engaged in other activities and not disturbed during the treatment cycle. Since the frequency of vibrations for humans has been selected above the audible spectrum they can sit in a room or theatre, receive the micro-massage of their body and resultant stimulation and at the same time enjoy a movie, play, lecture, etc. It is also contemplated that office buildings and factories contain biosonic walls to treat the workers during the day. This is especially so in those jobs which are tiring and for which stimulation is required.

While certain novel features of this invention have been disclosed herein and are pointed out in the claims, it will be understood that various omissions, substitutions, and changes may be made by those skilled in the art without departing from the spirit of this invention.

I claim:
1. A method of treating an inner region of an organic structure containing a fluid medium therein, comprising the steps of
   (a) placing the organic structure in a path of coherent wave energy so that said wave energy penetrates pervasively into the acoustically accessible inner region of said organic structure,
   (b) selecting and maintaining said elastic wave energy at a level of intensity below the cavitational threshold of the fluid medium within the inner region of said organic structure, and
   (c) selecting said elastic wave energy in said path having a frequency characterized in that when penetrating and traversing the inner region of said organic structure, said coherent elastic wave energy vibrates at said frequency the inner region of said organic structure, and a minimal quantity thereof is reflected and dissipated in the form of heat in the inner region treated.

2. A method as claimed in claim 1, wherein said coherent elastic wave energy is in a compressional wave form and within a frequency range of from 500 c.p.s. to 600,000 c.p.s.

3. A method as claimed in claim 1, wherein said elastic waves are generated over an area of sufficient size to substantially treat the entire organic structure at one time.

4. A method as claimed in claim 1, further including the step of determining the linear length of the organic structure in the direction of the path of said elastic wave energy.

5. A method as claimed in claim 4, wherein the frequency of vibration is selected having a wavelength substantially equal to the linear length of said organic structure.

6. A method as claimed in claim 4, wherein the frequency of vibration is selected in which an integral number of wavelengths is substantially equal to the linear length of the organic structure.

7. A method of treating an inner region of an organic structure containing a fluid medium therein, comprising the steps of
   (a) placing the organic structure in an elastic medium,
   (b) generating coherent elastic energy waves at a level of intensity below the cavitational threshold of the fluid medium within said organic structure and said elastic medium,
   (c) maintaining said organic structure and said source of generated waves in spaced relationship to each other,
   (d) transmitting said elastic energy waves through said elastic medium maintained free from cavitation, to traverse said organic element so that said coherent wave energy penetrates pervasively into the acoustically accessible inner region of said organic structure, and
(e) selecting a frequency band and intensity of said coherent elastic energy waves in relationship to the characteristics of the inner region of said organic structure wherein a greater percentage of said elastic wave energy is transmitted through the inner region treated in said organic structure than is absorbed and dissipated in the form of heat therein.

8. A method as claimed in claim 7, wherein said frequency of vibration is in the range between 500 c.p.s. and 600,000 c.p.s.

9. A method as claimed in claim 7, wherein the organic structure is a human and the frequency of elastic wave energy is between 16,000 c.p.s. and 100,000 c.p.s.

10. A method as claimed in claim 7, wherein said elastic medium is a liquid.

11. A method as claimed in claim 7, wherein said elastic medium is a gas.

12. A method as claimed in claim 7, wherein said organic structure is a living animal.

13. A method in accordance with claim 7, wherein the organic structure is a human and the wavelength and intensity of the elastic energy waves is established at a predetermined level based on the portion of the inner region of the human body to be treated.

14. A method of treating an organic structure containing a fluid medium therein, comprising the steps of
(a) placing the organic structure in an elastic medium,
(b) generating coherent elastic energy waves at a level of intensity below the cavitational threshold of the fluid medium within said organic structure,
(c) maintaining said organic structure and said source of generated waves in spaced relationship to each other,
(d) transmitting said elastic energy waves through said elastic medium, to traverse said organic element so that said coherent wave energy penetrates pervasively into the acoustically accessible inner region of said organic structure,
(e) selecting a frequency band and intensity of said coherent elastic energy waves in relationship to the characteristics of said organic structure wherein a greater percentage of said elastic wave energy is transmitted through said organic structure than is absorbed and dissipated in the form of heat therein, and
(f) modulating the frequency of said energy waves over a selected frequency range to produce a varying wavelength to prevent the formation of foci of energy, within the organic structure.

15. A method as claimed in claim 7, further including the step of reflecting said elastic waves after their passage through said organic structure to increase the utilization of said energy to irradiate said organic structure.

16. A method of treating an organic structure containing a fluid medium therein, comprising the steps of
(a) placing the organic structure in an elastic medium,
(b) generating coherent elastic energy waves at a level of intensity below the cavitational threshold of the fluid medium within said organic structure,
(c) maintaining said organic structure and said source of generated waves in spaced relationship to each other,
(d) transmitting said elastic energy waves through said elastic medium, to traverse said organic element so that said coherent wave energy penetrates pervasively into the acoustically accessible inner region of said organic structure,
(e) selecting a frequency band and intensity of said coherent elastic energy waves in relationship to the characteristics of said organic structure wherein a greater percentage of said elastic wave energy is transmitted through said organic structure than is absorbed and dissipated in the form of heat therein, and
(f) establishing relative movement between the organic structure to be treated and the transmitted coherent elastic energy waves to thereby present progressive surface areas to the elastic energy until the entire organic structure has been treated.

17. A method of treating an organic structure containing a fluid medium therein and more particularly living tissue for producing certain effects therein, and most notably in human tissues for therapeutic purposes, comprising the steps of
(a) providing an acoustic auditorium having at least one pair of spaced apart walls and capable of containing therein at least one organic structure,
(b) maintaining in said acoustic auditorium an elastic medium capable of transmitting elastic wave energy therethrough,
(c) coupling to one of said spaced apart walls an electromechanical transducer having a vibratory output surface which forms a biosonic wall,
(d) energizing said transducer in a frequency range of 16,000 c.p.s. to 600,000 c.p.s., so that said biosonic wall produces coherent elastic energy waves that are transmitted through said elastic medium to engage the organic structure within said acoustic auditorium for treatment thereof, said coherent elastic energy waves being at a level of intensity below the cavitational threshold of the fluid medium within said organic structure as they penetrate pervasively into the acoustically accessible inner region of said organic structure,
(e) reflecting the coherent elastic wave energy that is transmitted through said organic structure of said opposite wall for a secondary treatment of said organic structure, and
(f) modulating the elastic energy waves in a frequency band within said frequency range of 16,000 c.p.s. to 600,000 c.p.s.

18. A method as claimed in claim 17, wherein said coherent elastic energy waves are modulated to produce at said biosonic wall a varied wave pattern whereby permanent foci of energy are not established in the organic structure.

19. A method as claimed in claim 17, wherein said coherent elastic energy waves are produced both at a substantially fixed frequency and modulated in a frequency band in the audible range of the organic structure under treatment.

20. A method as claimed in claim 17, wherein the frequency modulation of said elastic energy waves is also related to the physical characteristics of the wall to obtain a variation in the loop and nodal regions thereof.

21. A method as claimed in claim 17, wherein said acoustical auditorium is adapted for the treatment of humans and is of sufficient size to at least substantially enclose one human therein at a time, while said human is simultaneously performing other normal functions.

22. A method as claimed in claim 21, wherein said acoustical auditorium is in the form of a bathtub.

23. A method as claimed in claim 21, wherein said acoustical auditorium is in the form of a bathing shower.

24. A method as claimed in claim 21, wherein said acoustical auditorium is in the form of a theatre.

25. A method as claimed in claim 21, wherein said acoustical auditorium is in the form of a swimming pool.

26. A method as claimed in claim 21, wherein said acoustical auditorium is in the form of a room.

27. Apparatus for therapeutically treating humans containing a fluid medium, comprising
(a) enclosure means in the form of an acoustical auditorium of a generally rectangular configuration having a bottom wall, spaced apart side walls and end walls and adapted to contain therein an elastic medium and a human.

(b) generating means associated with said enclosure means for producing ultrasonic coherent elastic energy waves in vibration transmission relationship to said elastic medium and at a frequency within the range of 16,000 c.p.s. to 100,000 c.p.s. and below the cavitational level of the fluid medium in the human, said energy waves are propagated through said elastic medium for treating the human, and (c) means for modulating the elastic energy waves produced by said generating means to obtain a varied wave pattern, whereby permanent foci of energy are not established within the human under treatment.

28. Apparatus as claimed in claim 27, wherein said generating means is coupled to one of said spaced apart walls to vibrate the latter as a biosonic wall and transmit coherent elastic energy waves over an area of sufficient size to substantially treat the entire human at one time.

29. Apparatus as claimed in claim 28, wherein said generating means includes a plurality of electromechanical transducers of the magnetostrictive type.

30. Apparatus as claimed in claim 28, wherein said generating means includes a plurality of electromechanical transducers of the piezoelectric type.

31. Apparatus as claimed in claim 27, further comprising switching means mounted within the acoustical auditorium to control the generating means by the human under treatment.

32. Apparatus as claimed in claim 27, further comprising adjustment means contained within the acoustical auditorium to permit the human under treatment to vary the frequency of vibration.

33. Apparatus as claimed in claim 27, wherein said elastic medium is a liquid and said enclosure means is liquid tight.

34. Apparatus as claimed in claim 27, wherein the dimensional size of said generally rectangular enclosure means is sufficient to at least substantially enclose one human therein at a time and permit said human to simultaneously perform other normal functions.

35. Apparatus as claimed in claim 27, further comprising means for reflecting the elastic waves after their passage through said human to increase their utilization for secondary treatment purposes.

36. Apparatus for treating an organic structure for producing certain effects therein, and most notably in humans for therapeutic purposes, to facilitate the movement of hardened body wastes within the intestinal tract, comprising (a) a supply of an elastic medium,
(b) a tool adapted to be inserted within the intestinal tract of a human and having an opening therethrough and associated with the supply of said elastic medium to permit its passage through said opening when the tool is inserted within the anal cavity of the human under treatment, and (c) vibration generating means coupled to said tool to vibrate the latter in the frequency range of 16,000 c.p.s. to 100,000 c.p.s. and produce coherent elastic energy waves that are transmitted through said elastic medium to engage the hardened body wastes within the intestinal tract and facilitate the movement of the body wastes contained therein due to the hardened body wastes being fluidized resulting in a viscosity lowering effect thereof.

37. A method of treating a human to facilitate the movement of hardened body wastes within the intestinal tract, comprising the steps of (a) generating coherent elastic energy waves from a transducer means through a tool adapted to be inserted within the intestinal tract of the human,
(b) introducing an elastic medium within the intestinal tract, and
(c) transmitting said elastic energy waves through said elastic medium to the hardened body wastes by inserting said tool within said intestinal tract, whereby due to the introduction of the coherent elastic energy waves therein the hardened body wastes will be fluidized resulting in a viscosity lowering effect to obtain movement of the hardened body wastes.

38. A method as claimed in claim 37, wherein the frequency of said elastic wave energy is between 500 cycles per second and 600,000 cycles per second.

References Cited

UNITED STATES PATENTS

| 2,828,114 | 3/1958 | Raudszus | 134—184 XR |
| 2,970,073 | 1/1961 | Prange. | |
| 3,251,219 | 5/1966 | Hertz et al. | |
| 3,352,303 | 11/1967 | Delaney | 128—24 |
| 3,358,677 | 12/1967 | Sheldon | 128—24 |

FOREIGN PATENTS

| 887,670 | 7/1943 | France. |
| 824,683 | 12/1951 | Germany. |

L. W. TRAPP, Primary Examiner

U.S. Cl. X.R.

47—13; 128—303